Jan. 2, 1923.
O. SCHLICHTER.
SLICING MACHINE.
ORIGINAL FILED JAN. 9, 1922.
1,440,632
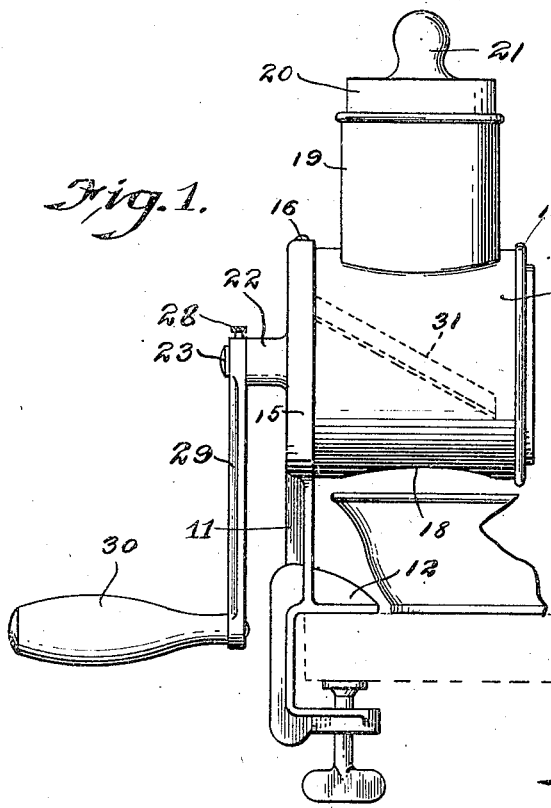
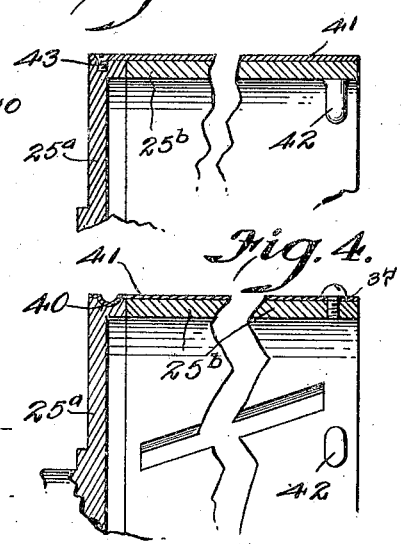
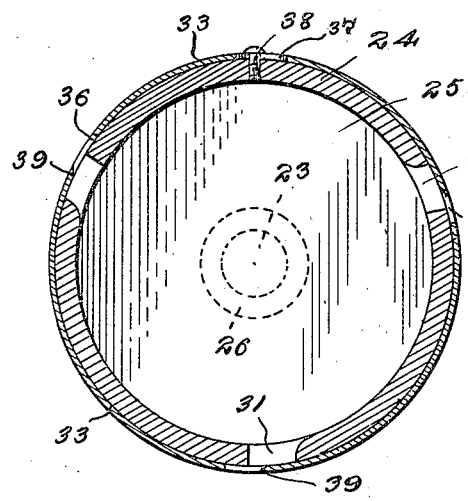
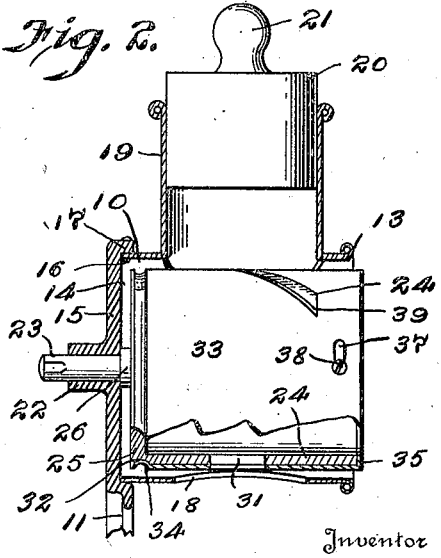
Inventor
Oscar Schlichter,
By H. L. Woodward
Attorney Patented Jan. 2, 1923.

1,440,632

UNITED STATES PATENT OFFICE.

OSCAR SCHLICHTER, OF HAMILTON, OHIO.

SLICING MACHINE.

Application filed January 9, 1922, Serial No. 527,925. Renewed November 13, 1922.

*To all whom it may concern:*

Be it known that I, OSCAR SCHLICHTER, a citizen of the United States, residing at Hamilton, in the county of Butler and State of Ohio, have invented certain new and useful Improvements in Slicing Machines, of which the following is a specification.

This application is in part a division of my application, Serial No. 454,336, filed March 22, 1921, for slicing machines.

The invention has for an object to effect improvements in meat and vegetable slicers, in which a hollow cylindrical rotating mandrel carrying blades operating over slots in the mandrel beneath a feed hopper is employed. It is an especial aim to effect economies in the manufacture of such an appliance. Another important aim is to enable the ready maintenance, adjustment and repair of the device. It is an especial purpose of the invention to provide a novel, efficient and cheap cutter and adjustment whereby various thicknesses of slices may be produced. Additional objects, advantages and features of invention will appear from the arrangement and combination of parts hereinafter shown, and more particularly described. In the drawings, Figure 1 is an elevational view of the embodiment of my invention, Fig. 2 is a vertical sectional view thereof, Fig. 3 is a cross section of the mandrel and cutter, Fig. 4 is a detail of a modification thereof, Fig. 5 shows a still further form thereof.

There is illustrated a meat and vegetable slicing machine comprising a cylindrical sheet metal casing 10 mounted in a cast frame 11 having a table clamping extension 12 therebelow. The casing 10 is disposed on a horizontal axis, and is formed with a rolled rim 13 at the forward end or mouth, while its rear end is of plain cylindrical form set snugly in a correspondingly shaped recess 14 of a circular plate 15 formed integrally with the frame, rivets 16 being engaged through the circumscribing flange 17 of the recess and the inserted end portion of the casing. A drain opening 18 is formed in the lower side of the casing, and inserted in an opening in the upper side of the casing, there is a vertical hopper 19 soldered or otherwise secured to the casing 10. The hopper 19 is of equal diameter from top to bottom, and vertically reciprocable therein there is a plunger 20, which may be formed of wood, and has a knob 21 at the upper side by which it may be manipulated. The hopper is formed with a rolled rim at the upper edge by which it is reinforced.

The opening 18 in the lower side of the casing permits the escape of juices readily from the knives, and makes it possible to collect the juice separately from the solid parts of the product. The casing is so located on the frame that when clamped upon a table, as shown in Fig. 1, a dish may be readily set upon the table top extending under the opening 18. The plate 15 is formed with a bearing sleeve 22 receiving revolubly the stud shaft 23 of a cylindrical hollow mandrel 24, having in one form an integral closed head portion 25 at the inner end from which the shaft 22 is extended. The head is spaced from the plate 15 by suitable bosses on the plate or head.

One side of the shaft 23 is flattened to receive the set screw 28 in the bored hub of a crank 29 snugly fitted on the shaft and having a handle 30, by which the device is operated. The mandrel is formed with a plurality of diagonal slots 31, which stop short of the outer end of the mandrel, but extend fully to the head 25 at their inner ends. The mandrel is provided with a circumscribing peripheral groove 32, intermediately of the thickness of the head 25, the forward side of which groove is inclined toward the open end of the mandrel.

Snugly fitted upon the mandrel and revoluble thereon, there is a sheet metal slicing cylinder 33, extending completely over the mandrel, lying flush with the back face of the head 25. The cylinder has its rear end portion pressed into the groove 32 snugly, so that the cylinder will be retained upon the mandrel in proper alinement therewith, but also free for rotation. The inwardly pressed portion of the cylinder forms a stiffening rib 34, tending to preserve the form of the cutter properly under conditions of use. The forward end of the cutter is formed with an inturned flange 35, which end lies closely against the forward end of the mandrel 24. The cutter is formed with a multiplicity of slots 36, which may be alined with respective slots in the mandrel, and are ordinarily formed of a slightly less width circumferentially, than the slots 31 of the mandrel. The cutter is formed with a short slot 37 at one point, intermediately of two slots 36, and customarily close to the outer end of the cutter, through which is engaged a binding screw 30 having threaded engagement in the body of the mandrel 24. By means of the screw 38 adjustment of the slots 36 of the cutter relatively to the slots in the mandrel may be fixed as desired, for various uses, to cut thick or thin slices, as will be more fully explained.

The edges of the slots 36 which will advance are beveled toward the inner side of the cutter and suitably sharpened.

In the use of the appliance thus described, when a product to be sliced is introduced into the hopper and pressed against the cutter 33 while being rotated, the cutting edges 39 will engage the stock being fed through the hopper, and by reason of the beveling of the edges toward the inner side, the stock will be drawn downwardly until it engages against the side of the slot 31 opposed to the cutting edge, which will determine the thickness of the slice cut, or, in case the cutter is adjusted with the cutting edges fully spaced from the opposed edges of the slot 36, the opposed edges in the cutter would then be positioned over the corresponding edges of the slots in the mandrel, and function similarly. The slots in the cutter are preferably made narrower than the slots in the mandrel, in order that the users will be deterred from adjusting the cutting edges of the cutter so far back that they will come too close to the corresponding edges of the slots in the mandrel, which would cause the sliced stock to strike abruptly against the sides of the slots in the mandrel, or if the cutter were still further back would prevent slicing at all.

The slot 37 is of such length and so positioned that the maximum rearward adjustment of the cutter will still leave the cutting edges 39 in advance of the adjacent corresponding edges of the slots in the mandrel.

In Figures 4 and 5 there is shown a modification, which may be found preferable, of the structure of the mandrel. In this form the mandrel is formed in two parts, namely the head or disc $25^a$ and the mandrel proper $25^b$, the inner end of which abuts the head when in assembled relation. The head $25^a$ is formed with a circumscribing groove 40, and into this groove there may be securely pressed and held, one end portion of the circular cutting sleeve 41, as shown. The mandrel $25^b$ is revolubly held within this sleeve, and is provided close to its outer edge with inwardly projected lugs or finger holds 42 for turning thereof to vary the thickness of the slice cut. A circumferential slot 37 is formed in the sleeve, as previously described, and serving the same purpose.

In adjusting the cutting blade of this form of mandrel, the sleeve 41 being held securely in the groove 40 of the head $25^a$, the set screw 38' is loosened and the mandrel $25^b$ rotated by means of the finger-holds 42 to the proper position. The correct adjustment having been attained, the screw 38' is tightened and the several parts thus held together, to be rotated as a single unit. Other means may be found desirable for holding the cutter blade upon the head $25^a$, and in Fig. 5, I have shown the blade held thereto by means of a screw 43.

What is claimed:—

1. In a slicing machine of the character described, a cylindrical mandrel having diagonal slots therein and a cylindrical slicing cutter revoluble upon the mandrel, similarly slotted and having the advancing edges of said slots sharpened, and means to fix the slicing cylinder adjustably upon the mandrel.

2. In a slicing machine of the character described, a cylindrical diagonally slotted mandrel, a cylindrical similarly slotted sheet metal cutter element having the advancing edges of the slots sharpened, said cutter having a slot therein transversely of the cutter, and a clamping screw engaged in the body of the mandrel through said slot and against the cutter, to adjustably hold the cutter at various positions on the mandrel and to limit adjustment of the cutter.

3. In a machine of the character described, a rotating mandrel having a planiform inner head part and an integral cylindrical platen, a plurality of slots therein and having a circumferential groove in the medial plane of the head, a thin sheet metal cylindrical cutter of corresponding proportions fitted snugly to and freely revoluble upon the mandrel, having slots to aline with those of the mandrel, the edges at one side sharpened, its inner part being set revolubly in said groove, and means to secure the cutter in adjusted positions on the mandrel.

4. In a slicing machine a hubbed mandrel head, a relatively revoluble mandrel abutting the head, and a cutter element enclosing the mandrel and head, for purposes described.

5. In a slicing machine, a circular mandrel head, a cutter element fixed thereto, a mandrel revoluble within the cutter at times and having parts cooperative with the cutter to limit its action, and means to fix the mandrel adjustably within the cutter.

6. A blade and mandrel assembly for rotary slicers comprising a crank operated head, a mandrel body abutting the head, a cutter sleeve fixed on the head receiving the mandrel revolubly therewithin, said mandrel having finger holds thereon, and means to secure the sleeve to the mandrel releasably.

In testimony whereof I have affixed my signature in presence of two witnesses.

OSCAR SCHLICHTER.

Witnesses:
E. J. BLACK,
H. L. KRAUTH.